United States Patent [19]

Walters

[11] Patent Number: 5,069,935

[45] Date of Patent: Dec. 3, 1991

[54] METHOD OF MAKING WATER-REPELLENT LEATHER GAME BALL

[75] Inventor: Peter J. Walters, Roselle, Ill.

[73] Assignee: Wilson Sporting Goods Co., River Grove, Ill.

[21] Appl. No.: 610,042

[22] Filed: Nov. 7, 1990

[51] Int. Cl.⁵ .............................................. B05D 1/00
[52] U.S. Cl. .................................. 427/209; 273/65 E;
273/334; 427/211; 427/290; 427/421; 427/425;
427/428; 427/430.1
[58] Field of Search .............. 427/209, 211, 290, 421,
427/425, 428, 430.1; 273/65 E, 334

[56] References Cited

U.S. PATENT DOCUMENTS

| | | | |
|---|---|---|---|
| 3,475,206 | 10/1969 | Heyden | 117/142 |
| 4,462,590 | 7/1984 | Mitchell | 273/65 E |
| 4,660,831 | 4/1987 | Kralik | 273/65 E |
| 4,701,269 | 10/1987 | Bay | 252/8.57 |
| 4,738,450 | 4/1988 | Wexler | 273/58 A |
| 4,755,187 | 7/1988 | Friese | 8/94.23 |

*Primary Examiner*—Bernard Pianalto

[57] ABSTRACT

A water-repellent leather game ball is provided by applying a water-repellent material to one side of a plurality of leather panels, securing the leather panels together to form the ball so that said one side of the panels are inside of the ball, and applying a coating of water-repellent material to the outisde surface of the ball.

17 Claims, 2 Drawing Sheets

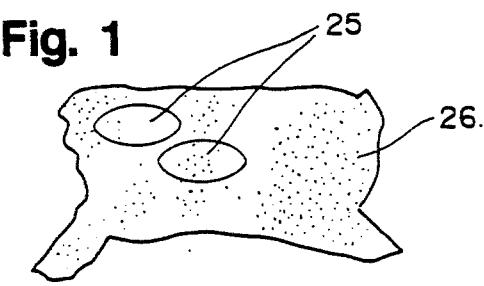
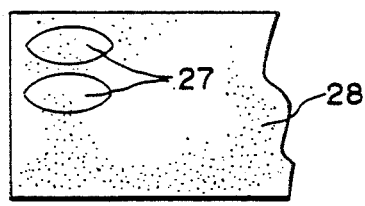
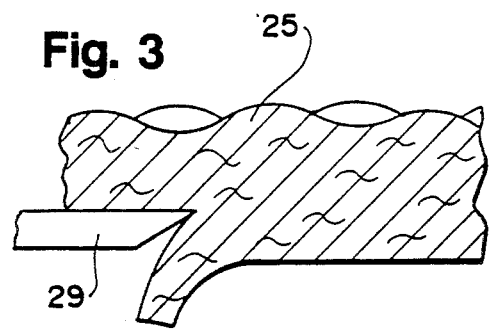
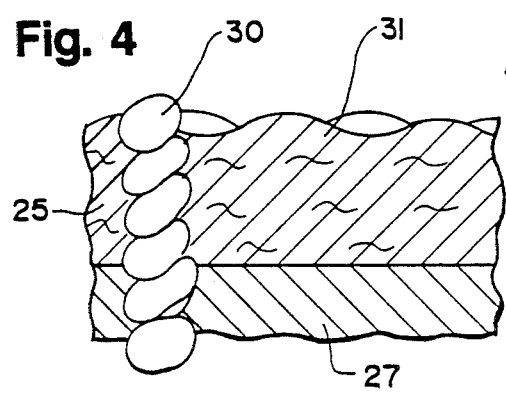
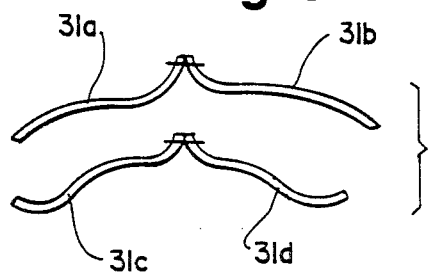
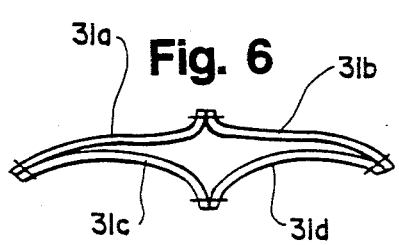
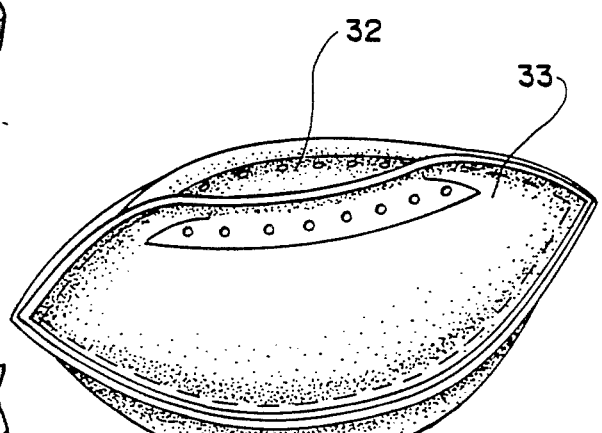

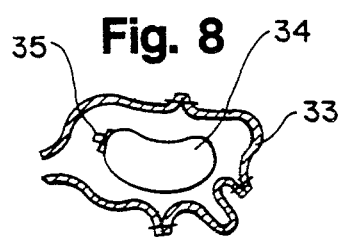
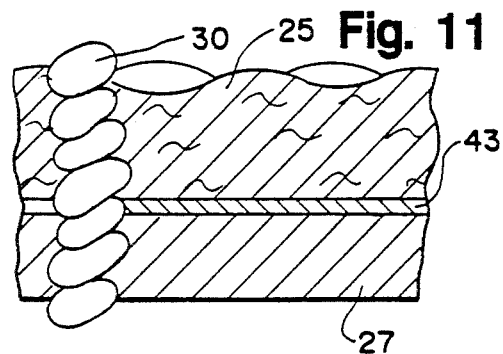
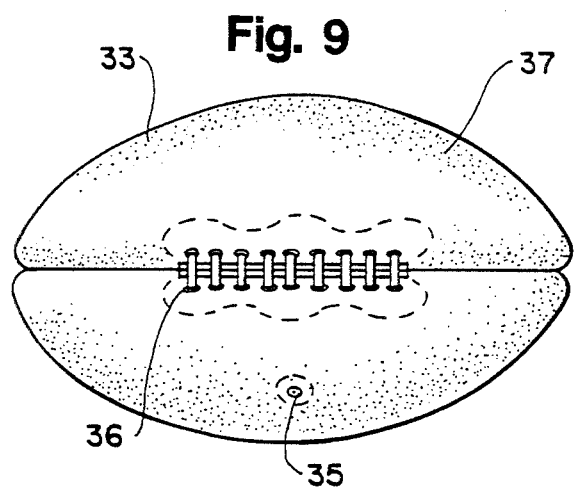
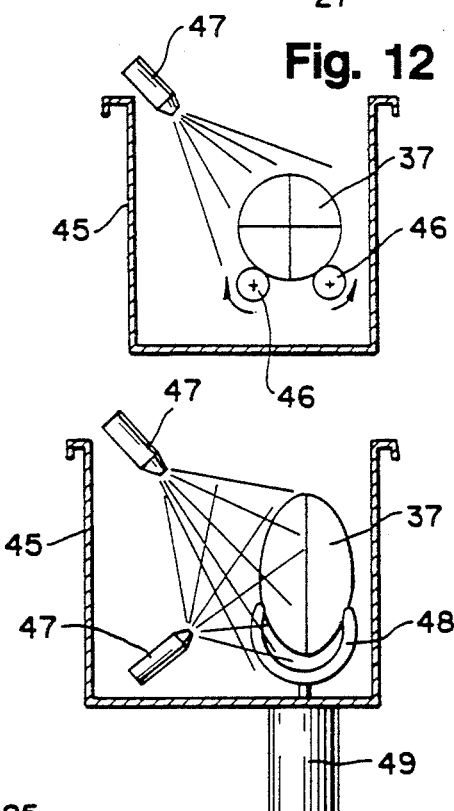
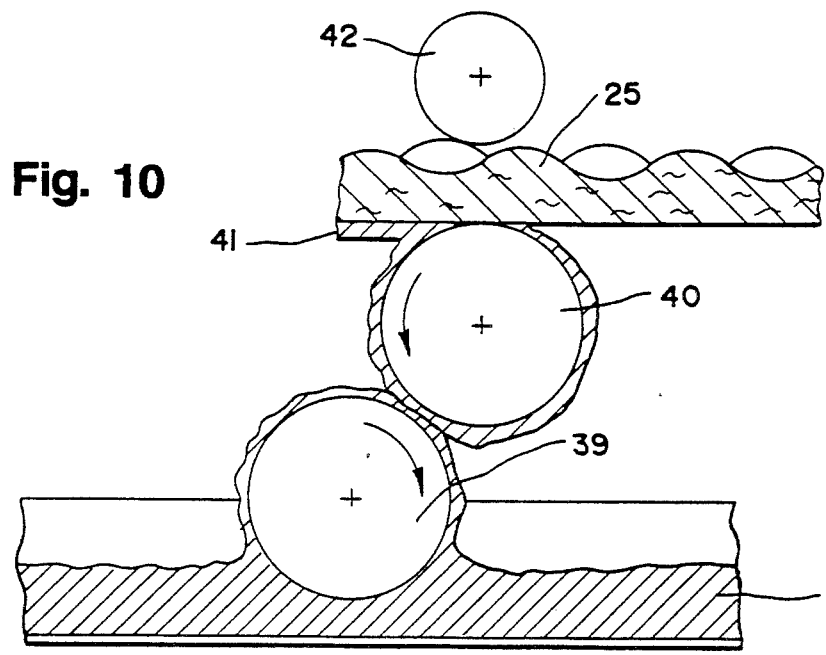

METHOD OF MAKING WATER-REPELLENT LEATHER GAME BALL

BACKGROUND

This invention relates to the process of applying a water-repellent material to leather game balls such as American-style footballs and rugby balls.

Premium game-quality footballs are made with a steerhide leather cover, not pigskin as often believed. Because of the beating that a football receives in a game, leather has proven to be a very durable material to use due to its intertwining fiber structure. The intertwining of the leather's fibers gives the material flexibility and strength.

For superior aerodynamics and grippability, football leather is formed with a pebbled surface. Along with the pebbled surface, football leather should have a tacky finish that gives the ball a good feel for gripping while throwing or catching the football.

With all of the foregoing in mind, tradition also plays an important part in the use of leather in game-quality footballs.

For American-style leather footballs, one company—Horween Leather Company of Chicago, Illinois—is considered to make the finest football leather in the world. Horween's football leather is tanned from 100% steer hides. The tannage is initially of a chrome type and is followed with a vegetable retannage. The leather is finished with a brown-red analine dye to give the leather its classic color along with a clear nitrocellulose topcoat to give the leather a scuff-resistant surface.

The key to the leather is its tanned-in tack, which greatly aids in the performance and feel of the football. This tack material is proprietary to Horween. The tanned-in tacky feel provides a maximum amount of gripping aid without causing the football to be too sticky, which could result in release problems when throwing the ball. Because this leather has been the material of choice by both professional (National Football League) and amateur (NCAA and Federation of National High School Athletics) football organizations, changing this leather could affect the outcome of the game.

Tradition is another important aspect of the game. Although the physical properties of a football—such as color, size, weight, feel, and performance—are specified by the above-mentioned governing bodies, these specifications have been created by the long-standing traditions since the introduction of the sport. Although leather has been used since the inception of the game, it is still the preferred material over synthetic materials even though leather has certain shortcomings.

Traditionally, football is played during the fall season when the weather becomes cold and rainy. A major shortcoming of the leather football has been that leather absorbs water when it becomes wet. In fact, leather is a highly hygroscopic material, and the characteristics of the leather are greatly affected by the moisture content. During inclement conditions, a leather football begins to absorb water which results in a gain in weight, loss of pebble conformation, and increase in slipperiness. When this happens, there is a great loss in the durability and performance of the football.

A football pebble is created when an embossing plate with the reverse contour of the pebble shape compresses the leather down and leaves the impression of the pebble. At the bottom of the pebble—or the valley—the leather has been compressed the most. When the leather takes water into its fibers, the material swells, which causes the embossed areas to lose their definition. Saturated with water, the pebble-less surface exhibits a great loss of grippability due to the change of coefficient of friction.

The added water in the leather will also cause the ball to gain weight. An official size football is specified to weigh 14 to 15 oz. and can gain an additional 5 to 6 oz. when wet. With the added weight and change in the surface characteristics, the football cannot be thrown as far or as accurately. Also, the football becomes more difficult to hold onto. The overall result is a loss in performance.

One way to have a wet leather football perform like a dry leather football is to treat the ball with a water-repellent material. However, the treatment, whether before or after constructing the leather into a football, should be done so that it does not change the color, feel, size, weight, and performance of the ball. Under dry conditions, the water-repellent football should show no appreciable change in color, feel, size, or weight compared to an untreated football; that is critical.

In 1984, Rawlings Sporting Goods Co., a company owned by Figgie International, Inc., introduced a football with a foam padding inner layer. The football is known as the ST-5 and is described in U.S. Pat. No. 4,462,590 as having a softer feel due to the foam layer. U.S. Pat. No. 4,660,831 describes an improved version of Rawlings'"inflatable padded game ball", introducing a new padding material along with the mention of a new bladder construction. Although not disclosed in either of these patents, Rawlings introduced the ST-5 with a water-repellent feature. This water-repellent feature was accomplished by applying a treatment material to the outside of the leather. The method of application is believed to be the submersion of the assembled leather football in a fluorocarbonbased water-repellent treatment material. The submersion causes a complete encapsulation of the football. The result is a leather football that repels water better than an untreated leather football. This information was collected from third party sources, since neither of the Rawlings patents discloses the method or material for the water-repellent treatment.

Although the water-repellency level of the Rawlings football is excellent, this method of treatment affects at least two of the other physical properties—color and feel. Rawlings' method of water-repellent treatment darkens the leather and reduces the tacky feel of the football. Also, the Rawlings water-repellent treatment method is only effective on footballs which contain a layer of foam padding behind the leather cover. The foam padding is believed to act as a gasket on the backside of the leather which resists the absorption of water that may enter through the lace holes and stitch holes.

SUMMARY OF THE INVENTION

A water-repellent leather game ball is provided by applying a water-repellent material to the leather panels before the ball is constructed and to the completed ball. Such a procedure does not change the important physical properties of color, feel, size, and weight. Changing those properties can change the performance of the ball, which may affect the outcome of the game.

DESCRIPTION OF THE DRAWING

The invention will be explained in conjunction with the accompanying drawing, in which FIG. 1 is a plan view illustrating the die cutting of oval-shaped leather panels from a steer hide;

FIG. 2 is a plan view showing oval-shaped lining panels being die cut from a sheet of vinyl-impregnated polyester fabric;

FIG. 3 is a cross sectional view of one of the leather panels showing the panel being split to a desired thickness;

FIG. 4 is a cross sectional view of a leather panel and a lining panel sewn together;

FIG. 5 illustrates two pairs of lined leather panels which are stitched together to form two half sections;

FIG. 6 illustrates the two half sections sewn together to form a full section;

FIG. 7 illustrates the full section which is turned inside out to form the carcass of the football;

FIG. 8 is a sectional view illustrating the bladder positioned inside of the carcass;

FIG. 9 illustrates the completed football;

FIG. 10 is a cross sectional view showing water-repellent material being roller-coated onto the backside of a leather panel;

FIG. 11 is a cross sectional view of a roller-coated leather panel stitched to a lining panel;

FIG. 12 illustrates water-repellent material being sprayed onto the exterior of a completed football which is rotated horizontally; and FIG. 13 illustrates water-repellent material being sprayed onto the exterior of a football which is rotated about a vertical axis.

GENERAL DESCRIPTION

A conventional full grain leather football for game use is constructed in the following method, which is illustrated in Figures 1) Four leather panels 25 are die cut from a hide 26 of football leather (FIG. 1).

2) Four lining panels 27 are die cut from a sheet 28 of vinyl-impregnated polyester fabric containing two or three plies (FIG. 2).

3) Two of the leather panels are hot-stamped with brand logos.

4) All of the leather panels 25 are split down to a specified thickness with a blade 29 (FIG. 3).

5) Each of the lining panels 27 is sewn to a leather panel 25 by cotton stitching 30 to form a lined leather panel 31 (FIG. 4).

6) On the lining side of each of the two lined panels containing the stamping, a smaller die cut piece of lining material is sewn in the area where the lace holes will be located. This is known as a "reinforcer." The sewing pattern is both functional and decorative.

7) The two stamped panels 31a and 31b are sewn together, and then the two unstamped panels 31c and 31d are sewn together (FIG. 5). Each of these two subassemblies is known as a "half section."

8) The half section containing the stamped panels is then subjected to a die cutting operation that creates the lace holes and a larger opening 32 (FIG. 7) along the seams. Later operations will be performed through this opening, and the opening will eventually be closed with a reinforced lacing material.

9) The two half sections are turned with the lining sides facing out and then sewn together to produce what is known as a "full section" (FIG. 6).

10) The ends and the seams of the full section are mechanically pounded to form and soften the harsh edges.

11) The full section is turned by hand inside-out through the opening at the lace holes so that the leather is on the outside of the football (FIG. 7). The "turned" full section is now known as the "carcass" 33.

12) A butyl rubber or synthetic bladder 34 is inserted into the carcass and adhesively or mechanically fastened to the carcass (FIG. 8). A valve 35 on the bladder is inserted through an opening in the carcass.

13) A protective piece of oval-shaped vinyl is sewn to the inside of the carcass. Known as a "flap", this part protects the bladder from puncture while being laced.

14) The opening through which the bladder was inserted into is sewn closed.

15) Through a series of looping motions through the sixteen lace holes previously die cut into the carcass, a cotton or vinyl lace 36 is used to also close the opening (FIG. 9).

16) In a steel mold with the impression of a football, the completely assembled carcass is inflated to 80 psi and then deflated to 13 psi—the specified internal air pressure.

17) A stripe may be added if specified.

DETAILED DESCRIPTION OF THE INVENTION

Known water-repellent materials are readily available on the market. Most water-repellent materials contain refined oils—especially silicone oil—which when applied to leather results in an oily, slippery feeling on the surface. This oily, slippery feeling is not acceptable since it affects the playability of the football. Non-silicone oil water-repellent treatments are also available commercially.

The water-repellent material used in this invention is a solution of a resin and a solvent carrier. The resin is a polyfluoroalkyl polymer, and the solvent is methylchloroform (1,1,1, trichloroethane). The material is available from Chase Products of Broadview, Illinois. The mixture of this resin that worked best in this application was 1±0.2 percent resin and 99±0.2 percent solvent.

The solvent is known to dissolve oils and fats. Commercially, the solvent is used to remove oil from various substrates. For example, the solvent is used as a dry cleaning fluid for fabrics and as an oil remover for steel parts.

Although this solvent is the only known material compatible with the resin, it created several problems with the oils, tackifying material, and synthetic finish found in football leather. Excessive amounts of the solvent in contact with the leather resulted in a staining and/or severe darkening of the leather. Also, excessive amounts of the solvent caused a blooming of the oils in the leather to the surface, resulting in a slippery feel.

In contrast, increasing the level of resin—given the same amount of solution used—resulted in a greater amount of resin on the surface, causing a more slippery feel and a glazed or plastic-like appearance. Testing was done with the above-mentioned polyfluoroalkyl polymer and methylchloroform solution in variations of ½ to 10 percent resin by weight. An optimal amount of protection is provided by a solution which does not create the effects caused by exposure of excessive amounts of solvent or resin. The solution that provided the optimal amount of protection contained a resin content of 1 to 2 percent.

As a means of determining the protection level of the football after it has been water-repellent treated, a test was devised with the control being the untreated football. Initially, a water spray test was developed which simulated rain. However, the results were so erratic that the test was determined unreliable and a new test was developed.

In the development of the new test, it was decided that the test must contain the most severe condition and should be relatively short to be efficient. The following standard test for determining the protection level of a water-repellent football was adopted:

1) inflate the football to 13 psi of air pressure;
2) weigh the complete football;
3) submerge the football in water for 15 seconds;
4) remove the football from the water and allow the excess water to run off for 15 seconds;
5) weigh the submerged football while waiting 30 seconds;
6) repeat steps 3, 4, and 5 for a total of 18 cycles for cumulative submersion time of 270 seconds; and
7) record the total weight gain.

This submersion test was not designed to duplicate the conditions during an inclement situation but rather was designed as an extremely severe test whereby a football exposed to water could be reliably judged.

Submersion test results for the untreated (Control) football along with the Rawlings ST-5 football were as follows:

| Water Submersion Test Samples | Wgt. Gain (grams) |
| --- | --- |
| Untreated Leather Football (Control) | 145.8 |
| Rawlings ST-5 Football | 43.9 |

SPRAYED FOOTBALL

The first method of application tried was to spray the polyfluoroalkyl-methylchloroform solution on the exterior of a completed football. Initial prototyping used a hand-held compressed air-type spray gun and several passes were made. Testing of the samples showed virtually no protection when compared to an untreated football. At this time I believed that there were too many inconsistencies with the hand-held spraying. A spray system supplier was contacted to develop an automatic system where one, two, or three coats of material could be evenly applied to the footballs. This was done by holding the football in a fixture and then rotating it longitudinally while spraying on the treatment material. However, it was found that the solvent in the water-repellent treatment material evaporates at too high of a rate for spraying. Even if the spray gun is held close to the substrate, the mixture of air into the treatment material and the small size of the spray droplets—as found in a compressed air-type system—resulted in the solvent evaporating at an accelerated rate, leaving the polyfluoroalkyl resin to literally bounce off of the substrate. Using spray guns made by both Binks Manufacturing and DeVilbiss, very little protection was found even with multiple passes. This method was abandoned due to its poor performance.

Submersion test results for leather footballs sprayed from a compressed air-type spray gun using the polyfluoroalkyl treatment material were as follows:

| Water Submersion Test Samples | Wgt. Gain (grams) |
| --- | --- |
| Untreated Leather Football (Control) | 145.8 |
| Air Sprayed Football | 138.3 |

SUBMERGED FOOTBALL

Another method of application used was the submersion of a completed ball in the polyfluoroalkyl-methylchloroform solution. At a submersion time of 15 seconds, the result was protection superior to the ST-5 football.

One reason for the long submersion time was the need for even penetration and coverage of the football with the water-repellent material. However, the even coverage resulted in a complete darkening of the football due to the methylchloroform solvent reacting with the oils and dyes in the leather. Also, this type of water-repellent material is known as a "filmformer," which means that as the solvent evaporates, it forms a skin or film on the substrate. Because the solvent evaporates at the surface first, a film forms on the surface that traps the solvent absorbed into the leather. The trapping of this solvent prolongs the reaction with the oils and dyes in the leather. Again, an optimal amount of water-repellent material is needed to provide the maximum amount of protection without changing the football's physical properties.

Due to the pressures of submersion along with the penetrating nature of the solvent, the water-repellent material is forced into the orifices—such as lace holes and stitch holes—of the football. The longer the submersion time, the deeper the penetration of the water-repellent material and the greater the degree of water-repellent protection.

Testing shows that a submersion time of less than one second may reduce the amount of darkening and staining of the leather since less water-repellent material is applied. However, the water-repellent protection is less and the color and cosmetic look of the leather is still unacceptable.

Although the correct level of water-repellent protection may be provided using the submersion method with the polyfluoroalkyl resin, the treated football is unacceptable for use due to the change in color and feel. Significant staining results from using the submersion method.

Several solvents with faster and slower evaporation rates were tried with the methylchloroform/polyfluoroalkyl solution in hopes of reducing the degrees of staining. None of the other solvents made a difference in the staining. The submersion method is unacceptable for use on a football made under conventional construction.

Submersion test results for footballs submerged in treatment material for various time periods along with the Control are as follows:

| Water Submersion Test Samples | Wgt. Gain (grams) |
| --- | --- |
| Untreated Leather Football (Control) | 145.8 |
| Conventional Football submerged in material for <1 sec. | 64.8 |
| Conventional Football submerged in | 55.9 |

| Water Submersion Test Samples | Wgt. Gain (grams) |
| --- | --- |
| material for 5 sec. | |
| Conventional Football submerged in material for 10 sec. | 32.9 |
| Conventional Football submerged in material for 15 sec. | 31.8 |

Inventive Method

All of the methods previously described use a treatment on an assembled football. The invention uses a method of application that treats parts of the football during and after construction.

To provide excellent protection and also maintain the look and feel of the untreated football, treating the football with the polyfluoroaklyl material must be done in different stages of the football's construction. After the leather panels for a football have been split to their final thickness, the water-repellent material is applied to the backside or "fleshy side" of the leather. This is the side which will form the inside surface of the carcass. Three methods of applying the water-repellent material to the back side of the leather have been used:

1) airless-type spray,
2) roller-coat, and
3) submerge the entire panel.

When the football is completely assembled, a single coat of the water-repellent material is applied to the outside surface of the ball with an airless-type sprayer. Airless-type spray equipment mechanically or pneumatically pumps the material through an orifice without incorporating air into the stream.

EXAMPLES

The insides or backsides of the four leather panels for forming a football were treated by spraying or roller-coating 18 grams total of the polyfluoroalkyl/methyl-chloroform water-repellent material onto each panel. After the football was constructed, 62 grams of water-repellent material was sprayed by an airless sprayer to the outside of the completed football. The airless sprayer was an Autojet ¼ JAUH from Spraying Systems Co. of Wheaton, Illinois. The spray tip was a Veejet 6502 The football was held in a fixture and rotated on its long axis. The axis of rotation can be horizontal or vertical. The optimum number of rotations was determined to be 1 ⅛ at a speed of 24-34 RPM. More than two rotations or over 70 grams of material applied too much protection which affected the feel of the football.

The settings on the pressure pot was 20 to 26 psi. The orifice size on the spray nozzle was 0.036 inch with an 65° flat vee spray pattern. Two spray guns were used, and each one was mounted on a rod that was aligned with the long axis of the football. The guns were mounted at opposite ends of the football, and each gun sprayed one-half of the football with a one inch overlap in the center. Each gun was mounted about 6-8 inches from the ball.

Another procedure for treating the backside of the panels was to submerge the panels in the treatment material. However, 73 grams of treatment material was used due to the highly absorbent nature of the material. The submersion time was less than one second. A single coat of 62 grams of treatment material was sprayed by airless sprayer to the outside of the completed football as previously described.

Submerging the leather panels alone without spraying the outside of the completed football will not provide effective water-repellency. Since the material is a filmformer, the submerged panel will be encapsulated. However, once the panels of the football are sewn, the treatment material is punctured by the sewing needle and provides an entranceway for water to enter.

One shortcoming with the submersion/spray method is that the outside of the leather is coated twice, which may change the feel of the leather.

Submerging the leather panels did not result in any staining with a slight darkening of the color of the leather. That is because the solvent dries quickly and evenly on the individual panels, while an assembled football can trap solvent when submerged in water-repellent material.

Submersion test results for the roller-coat/spray method, panel submersion/spray method, and panel submersion only method along with the Control and the ST-5 are as follows:

| Water Submersion Test Samples | Wgt. Gain (grams) |
| --- | --- |
| Untreated Leather Football (Control) | 145.8 |
| ST-5 Football | 43.9 |
| Panel Roller-Coat/Spray Assembled Football Method | 48.2 |
| Panel Submersion/Spray Assembled Football Method | 53.9 |
| Panel Submersion/No Outside Spray Method | 140.5 |

The procedure which has been selected for treating commercial footballs is illustrated in FIGS. 10-13. Referring first to FIG. 10, the individual leather panels 25 are roller-coated with polyfluoroalkyl/methyl-chloroform material 38 having a resin content of 1±0.2 percent by weight. The material is applied by a pick-up roller 39 and a transfer roller 40, which applies a coating 41 on the back side of the pebbled leather panel. The panel is held against the transfer roller by a top roller 42.

The roller coater is a 9 inch type 2R9 from Potdevin Machine Co. of Teterboro, New Jersey. The rollers are covered by a knit cotton cloth sock to facilitate pick-up and transfer of the water-repellent material to the leather.

The leather panels are fed into the roller coater one at a time with the pebble side up. Average pick-up of water-repellent material for each panel is 1 gram wet weight or 0.010 ±0.002 grams dry weight using material with a resin content of 1±0.2 percent.

After the leather panels pass through the roller coater, they are placed on the shelf in a ventilation hood in order to flash off the solvent. When flash-off is complete, the panels are restacked and moved to the next production step.

FIG. 11 illustrates a leather panel 25 with a layer 43 of dried water-repellent material stitched to a lining panel 27 with cotton thread 30.

When each football is completed, it is placed in a spraying apparatus illustrated in FIG. 12 which includes a spray tank 45 and rollers 46 for rotating the football with its long axis extending horizontally. A pair of spray guns 47 are located 7 inches from the football and are set at an angle of 45 ±2 degrees from the horizontal. The two spray guns are spaced 12 inches apart. The spray guns are Autojet ¼ JAUH airless spray guns from Spraying Systems Co. of Wheaton, Illinois with Veejet 6502 tips. The water-repellent material is supplied by a 30 gallon stainless steel lined pressure pot, and the pot pressure is set at 40 psig. The spray timers are set at 1.5 seconds, and air activation pressure is set at 40 to 45 psig.

The ball is rotated about its long axis, which extends horizontally, for one complete rotation in 1.5 seconds, and the amount of water-repellent material which is delievered to the balls by the spray guns is 37±2 grams.

The sprayed footballs are placed in a vented drying oven with a conveyor. The heater unit of the oven is set to 140 ±5 degrees F., and the conveyor is set for a speed of 2.8±0.2 feet per minute. The travel time of each ball through the drying oven is 8 minutes and 30 seconds ±30 seconds.

FIG. 13 illustrates an alternate embodiment in which a football 38 is rotated in a fixture 48 so that the long axis of the football extends vertically. The FIG. 48 is rotated about a vertical axis by a drive motor 49. Two spray guns 47 are set at an angle of 45±2 degrees from the vertical and are spaced 12-14 inches apart vertically.

Although the specific examples described herein are footballs, the invention can also be used on other game balls such as rugby balls, outdoor basketballs, soccer balls, and the like.

While in the foregoing specification a detailed description of a specific embodiment of the invention was set forth for the purpose of illustration, it will be understood that many of the details herein given may be varied considerably by those skilled in the art without departing from the spirit and scope of the invention.

I claim:

1. A method of making a water-repellent leather game ball having an inflatable bladder and an outer carcass which encloses the bladder, the carcass being formed from a plurality of leather panels which are secured together, the method comprising the steps of:
   forming said panels,
   applying a coating of water-repellent material to one side of each of the panels,
   securing the panels together to form the carcass and positioning the bladder inside the carcass to form the game ball, said one side of each panel facing the bladder and forming the inside surface of the carcass, and
   applying a coating of water-repellent material to the outside surface of the carcass.

2. The method of claim 1 in which the step of applying a coating of water-repellent material to said one side of each of the panels is performed by spraying the water-repellent coating on said one side.

3. The method of claim 1 in which the step of applying a coating of water-repellent material to said one side of each of the panels is performed by airless spraying the water-repellent coating on said one side.

4. The method of claim 1 in which the step of applying a coating of water-repellent material to said one side of each of the panels is performed by roller coating the water-repellent coating on said one side.

5. The method of claim 1 in which the step of applying a coating of water-repellent material to said one side of each of the panels is performed by submerging each of the panels in water-repellent material.

6. The method of claim 1 in which the step of applying a coating of water-repellent material to the outside surface of the carcass is performed by spraying water-repellent material to the outside surface of the carcass.

7. The method of claim 1 in which the step of applying a coating of water-repellent material to the outside surface of the carcass is performed by airless spraying a coating of water-repellent material to the outside surface of the carcass.

8. The method of claim 1 in which the water-repellent material is a solution of polyfluoroalkyl polymer resin in methylchloroform solvent.

9. The method of claim 8 in which the resin content of the water repellent material is about 1 to 2% by weight.

10. The method of claim 8 in which about 18 grams of water-repellent material was applied to each of said one sides.

11. The method of claim 8 in which about 62 grams of water-repellent material was applied to the outside surface of the carcass.

12. The method of claim 11 in which the nozzles are aligned with the axis of rotation of the ball.

13. The method of claim 12 in which the ball is a football having a long axis and the football is rotated about the long axis.

14. The method of claim 13 in which the football is rotated about 1 ½ revolution while the water repellent coating is applied to the outside surfaces of the carcass.

15. The method of claim 14 in which the football is rotated at a speed of about 24-34 rpm.

16. The method of claim 15 in which about 62 grams of water-repellent material having a resin content of about 1 to 2% by weight is sprayed onto the outside surface of the carcass.

17. The method of claim 1 in which the step of applying a coating of water-repellent material to the outside surface of the carcass is performed by rotating the ball about an axis and spraying the water-repellent material onto the ball through a pair of nozzles.

* * * * *